US012179681B2

United States Patent
Ohno

(10) Patent No.: US 12,179,681 B2
(45) Date of Patent: Dec. 31, 2024

(54) LOWER LIMB RESTRAINT AIRBAG DEVICE

(71) Applicant: TOYOTA JIDOSHA KABUSHIKI KAISHA, Toyota (JP)

(72) Inventor: Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/378,683

(22) Filed: Oct. 11, 2023

(65) Prior Publication Data

US 2024/0140345 A1 May 2, 2024

(30) Foreign Application Priority Data

Oct. 31, 2022 (JP) .............................. JP2022-175007

(51) Int. Cl.
*B60R 21/206* (2011.01)
*B60R 21/055* (2006.01)
*B60R 21/2338* (2011.01)
*B60R 21/00* (2006.01)
*B60R 21/231* (2011.01)
*B60R 21/264* (2006.01)

(52) U.S. Cl.
CPC .......... *B60R 21/055* (2013.01); *B60R 21/206* (2013.01); *B60R 21/2338* (2013.01); *B60R 2021/0051* (2013.01); *B60R 2021/23107* (2013.01); *B60R 2021/23169* (2013.01); *B60R 2021/23386* (2013.01); *B60R 21/264* (2013.01)

(58) Field of Classification Search
CPC ... B60R 21/055; B60R 21/206; B60R 21/205; B60R 21/2338; B60R 21/264; B60R 21/231; B60R 2021/23386; B60R 2021/0051; B60R 2021/23169; B60R 2021/161; B60R 2021/23107; B60R 2021/0053; B60R 2021/0273; B60R 2021/0032; B60R 2021/0034
USPC ............ 280/728.1, 728.2, 730.1, 730.2, 732, 280/743.1, 743.2
See application file for complete search history.

(56) References Cited

U.S. PATENT DOCUMENTS

| 2006/0284400 A1* | 12/2006 | Sakakibara | ......... B60R 21/2155 280/732 |
| 2008/0079245 A1* | 4/2008 | Bito | ...................... B60R 21/206 280/730.1 |
| 2015/0061268 A1* | 3/2015 | Nagasawa | ............. B60R 21/231 280/730.1 |

(Continued)

FOREIGN PATENT DOCUMENTS

| DE | 102010035089 A1 * | 2/2012 | .......... B60R 21/045 |
| JP | 2004291790 A * | 10/2004 | |

(Continued)

*Primary Examiner* — Keith J Frisby
(74) *Attorney, Agent, or Firm* — Dinsmore & Shohl LLP

(57) ABSTRACT

A lower limb restraint airbag device, including: an airbag that is configured to be inflated and deployed toward a knee and a shin of a passenger seated in a vehicle seat by gas ejected from an inflator, and to make contact with at least the knee; a reaction force plate that is configured to be pulled out to a seat front side of the airbag in conjunction with inflation and deployment of the airbag; and a lock mechanism that is configured to block movement toward a seat front side of the pulled out reaction force plate.

15 Claims, 11 Drawing Sheets

(56) References Cited

U.S. PATENT DOCUMENTS

2020/0062211 A1\* 2/2020 Deng .................... B60R 21/205
2021/0300287 A1\* 9/2021 Rosenberg ............ B60R 21/215

FOREIGN PATENT DOCUMENTS

| JP | 2004352037 A | \* | 12/2004 |
| JP | 2006188206 A | \* | 7/2006 |
| JP | 2018030555 A | \* | 3/2018 |
| JP | 2018-161963 A | | 10/2018 |
| JP | 2022011206 A | \* | 1/2022 |

\* cited by examiner

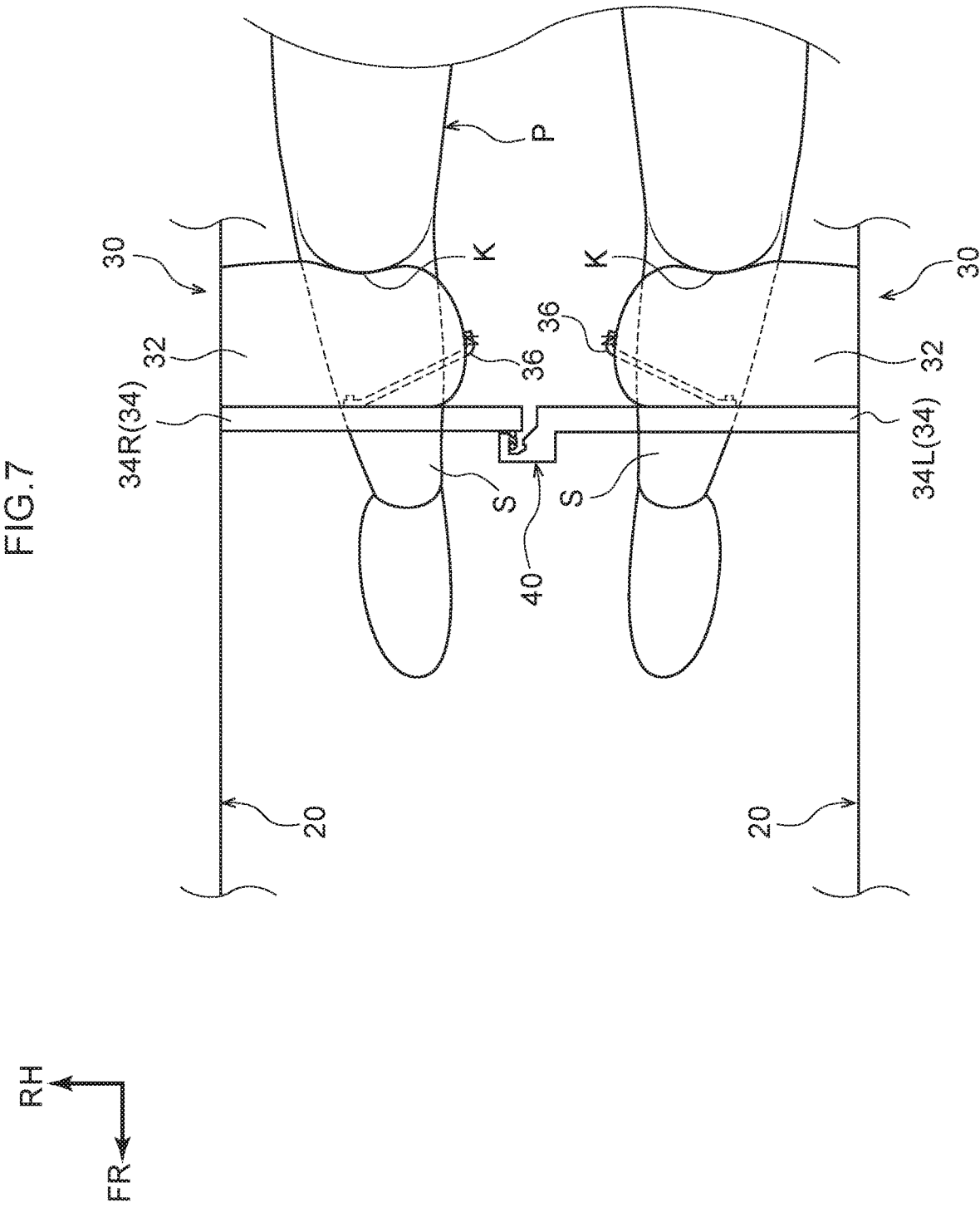

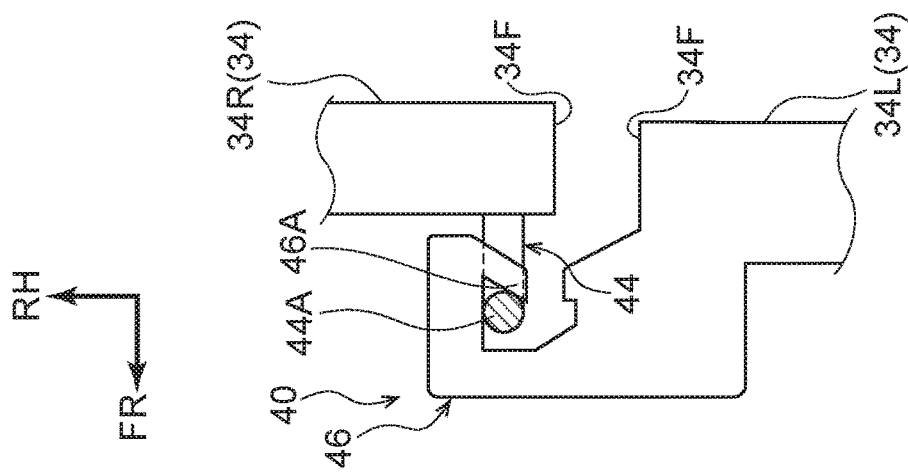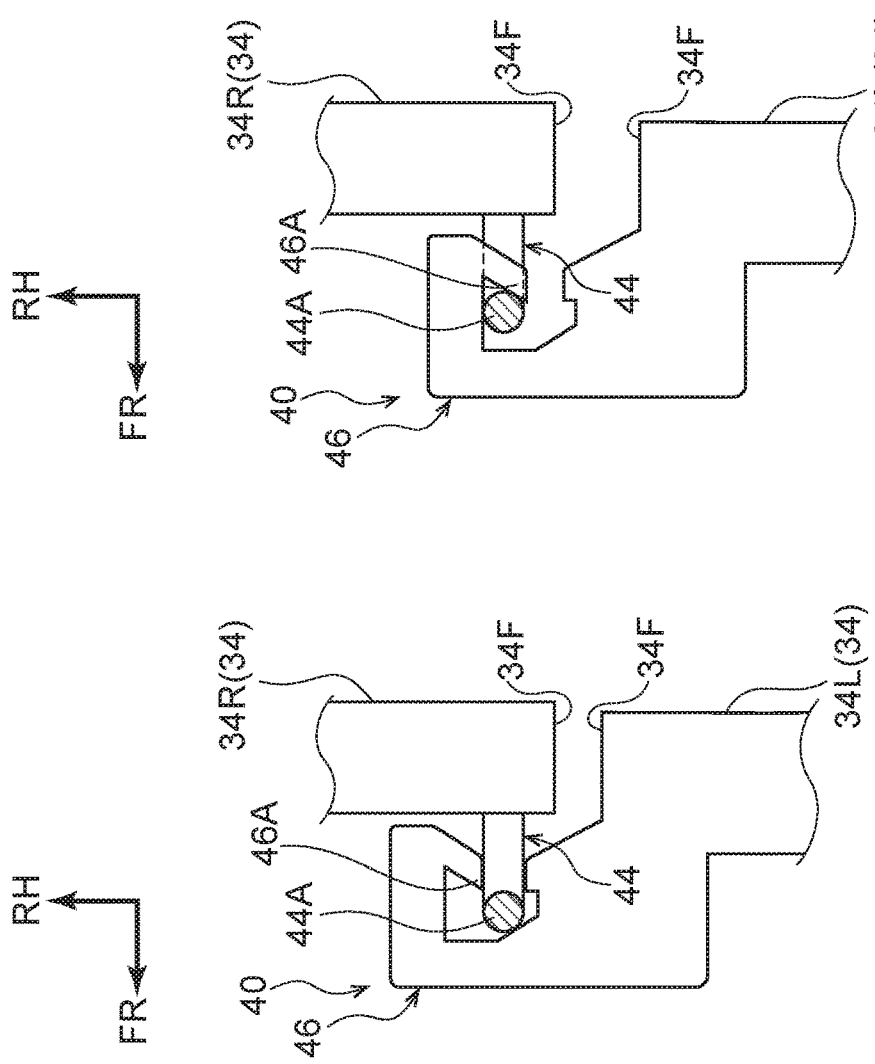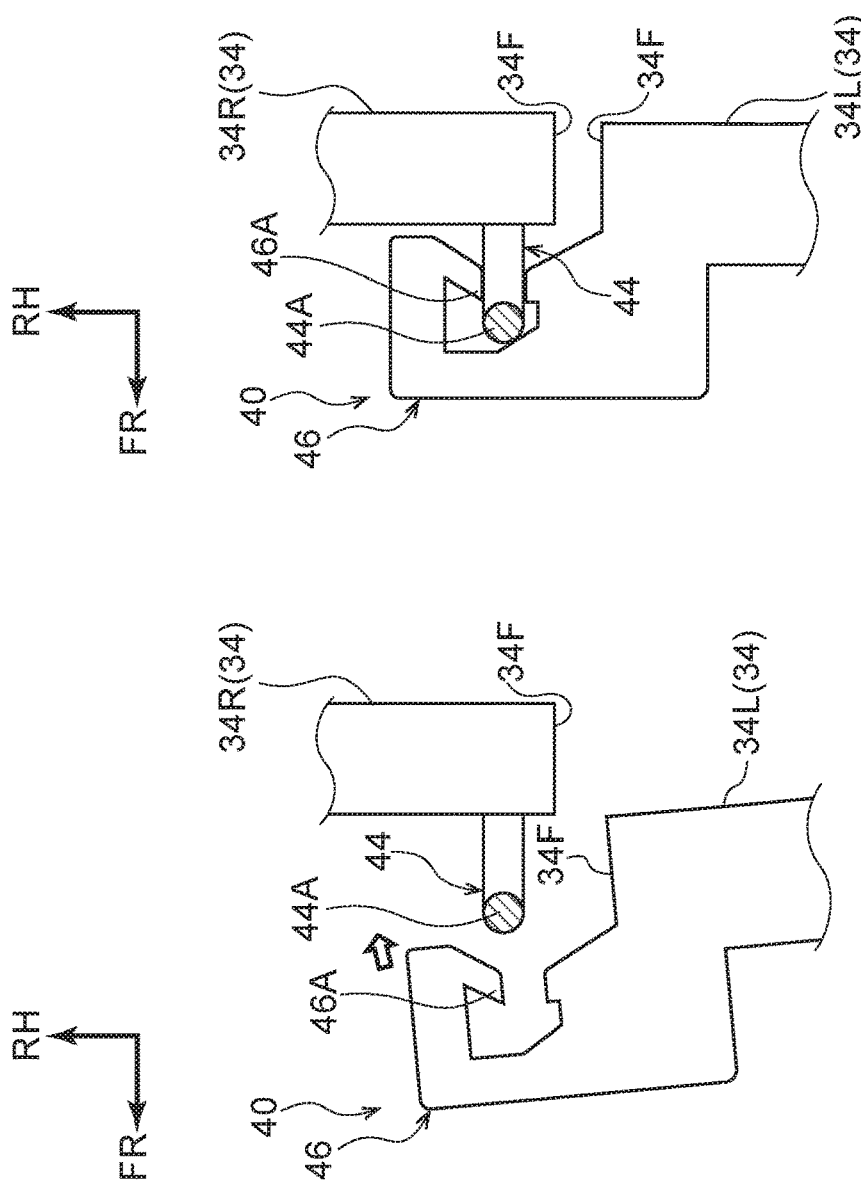

LOWER LIMB RESTRAINT AIRBAG DEVICE

CROSS-REFERENCE TO RELATED APPLICATION

This application is based on and claims priority under 35 USC 119 from Japanese Patent Application No. 2022-175007 filed on Oct. 31, 2022, the disclosure of which is incorporated by reference herein.

BACKGROUND

Technical Field

The present disclosure relates to a lower limb restraint airbag device.

Related Art

Some passenger protection devices include a right-knee airbag and a left-knee airbag inflated and deployed from left and right sides of a passenger seated in a seat of a vehicle toward the knees of the passenger so as to respectively press the left and right knees of the passenger (see, for example, Japanese Patent Application Laid-Open (JP-A) No. 2018-161963). The right-knee airbag includes a right-knee front contact face that contacts the front side of the right knee of the passenger in a deployed state, and the left-knee airbag includes a left-knee front contact face that contacts the front side of the left knee of the passenger in a deployed state.

However, in the passenger protection device configured as described above, the left-right pair of knee airbags are merely mutually deployed toward a seat width direction center, and there is no reaction force surface for each other knee airbag. This means that, for example, sufficient restraining force is not obtained with the left-right pair of knee airbags in cases in which there is a wide space present at a front side of the knees of the passenger seated in the vehicle seat, such as when a front seat that has been moved greatly toward the rear side, for example. In particular the restraining force is small at an initial-stage of a collision. There is accordingly room for improvement in a lower limb restraint airbag device for cases in which there is a wide space present at a front side of the knees of a passenger seated in a vehicle seat.

SUMMARY

The present disclosure obtains a lower limb restraint airbag device capable of effectively restraining knees of a passenger seated in a vehicle seat even in cases in which there is a wide space present at a seat front side of the knees of the passenger.

A lower limb restraint airbag device of a first aspect according to the present disclosure includes an airbag that is configured to be inflated and deployed toward a knee and a shin of a passenger seated in a vehicle seat by gas ejected from an inflator and to make contact with at least the knee, a reaction force plate that is configured to be pulled out to a seat front side of the airbag in conjunction with inflation and deployment of the airbag, and a lock mechanism that is configured to block movement toward a seat front side of the pulled out reaction force plate.

In the lower limb restraint airbag device of the first aspect, the airbag is inflated and deployed toward the knee and the shin of the passenger seated in the vehicle seat by the gas ejected from the inflator, and makes contact with at least the knee. The reaction force plate is pulled out to the seat front side of the airbag in conjunction with inflation and deployment of the airbag, and movement toward the seat front side of the pulled out reaction force plate is blocked by the lock mechanism.

Namely, the reaction force plate forms a reaction force surface against the airbag. This means that load from the knees and the shins of the passenger attempting to move toward the seat front side due to inertia is effectively borne by the airbag supported by the reaction force plate. This means that the knees of the passenger seated in the vehicle seat are effectively restrained even in cases in which there is a wide space present at the seat front side of the knees of the passenger.

Moreover, a lower limb restraint airbag device of a second aspect is the lower limb restraint airbag device of the first aspect, wherein one each of the inflator, the airbag, the reaction force plate, and the lock mechanism is provided for a left knee and for a right knee of the passenger and is installed at respective side walls disposed at the left and right sides of the vehicle seat.

In the lower limb restraint airbag device of the second aspect, the inflator, the airbag, the reaction force plate, and the lock mechanism are provided for the left and right knees of the passenger and installed at respective side walls disposed at the left and right sides of the vehicle seat. This means that, for example, improper restraint for either the left knee or the right knee of the passenger is suppressed from occurring compared to a configuration in which a side wall is disposed on only one of the left or right sides, and the left and right knees of the passenger are restrained by a single airbag.

Moreover, a lower limb restraint airbag device of a third aspect is the lower limb restraint airbag device of the second aspect, wherein the reaction force plates are swingably supported by the side walls and are linked to the airbags by straps.

In the lower limb restraint airbag device of the third aspect, the reaction force plates are swingably supported by the side walls and are linked to the airbags by the straps. This means that pull out of the reaction force plates in conjunction with the inflation and deployment of the airbags can be realized with a simple configuration.

A lower limb restraint airbag device of the fourth aspect is the lower limb restraint airbag device of the third aspect, wherein the lock mechanism includes a lock bar having a one-end portion slidably retained in a guide groove formed at the side wall and having an other-end portion swingably attached to the reaction force plate, and the guide groove includes a recess that immovably houses the one-end portion of the lock bar after the reaction force plate has been pulled out.

In the lower limb restraint airbag device of the fourth aspect, the lock mechanism includes the lock bar having the one-end portion swingably retained in the guide groove formed at the side wall and having the other-end portion swingably attached to the reaction force plate. The guide groove includes the recess that immovably houses the one-end portion of the lock bar after the reaction force plate has been pulled out. This thereby enables blocking movement toward the seat front side of the pulled out reaction force plate to be realized with a simple configuration.

A lower limb restraint airbag device of a fifth aspect is the lower limb restraint airbag device of the third aspect, wherein the lock mechanism includes a striker that is provided at one of the reaction force plates and a hook that is provided at the other of the reaction force plates and that is configured to anchor to the striker, and the reaction force plate provided with the hook is configured to swing with a delay relative to the reaction force plate provided with the striker.

In the lower limb restraint airbag device of the fifth aspect, the lock mechanism includes the striker that is provided at the one of the reaction force plates and the hook that is provided at the other of the reaction force plates and that is configured to anchor to the striker. The reaction force plate provided with the hook is configured to swing with a delay relative to the reaction force plate provided with the striker. This thereby enables poor anchoring of the hook onto the striker to be prevented from occurring, and enables blocking movement toward the seat front side of the pulled out reaction force plate to be realized with a simple configuration.

Moreover, a lower limb restraint airbag device of a sixth aspect is the lower limb restraint airbag device of the fifth aspect, wherein the reaction force plate provided with the hook is heavier than the reaction force plate provided with the striker.

In the lower limb restraint airbag device of the sixth aspect, the reaction force plate provided with the hook is heavier than the reaction force plate provided with the striker. This enables swinging of the reaction force plate provided with the hook delayed relative to the reaction force plate provided with the striker to be realized using a simple configuration.

Moreover, a lower limb restraint airbag device of a seventh aspect is the lower limb restraint airbag device of the fifth aspect, wherein an ignition timing of the inflator that ejects gas into the airbag linked by the strap to the reaction force plate provided with the hook is delayed relative to an ignition timing of the inflator that ejects gas into the airbag linked by the strap to the reaction force plate provided with the striker.

In the lower limb restraint airbag device of the seventh aspect, the ignition timing of the inflator that ejects gas into the airbag linked by the strap to the reaction force plate provided with the hook is delayed relative to the ignition timing of the inflator that ejects gas into the airbag linked by the strap to the reaction force plate provided with the striker. This enables swinging of the reaction force plate provided with the hook delayed relative to the reaction force plate provided with the striker to be realized using a simple configuration.

A lower limb restraint airbag device of an eighth aspect is the lower limb restraint airbag device of the third aspect, wherein the lock mechanism includes a striker that is provided at one of the reaction force plates, and a hook that is provided swingably at the other of the reaction force plates and that is configured to anchor to the striker, and the hook is configured to swing and be anchored to the striker after the reaction force plate provided with the striker and the reaction force plate provided with the hook have been pulled out.

In the lower limb restraint airbag device of the eighth aspect, the lock mechanism includes the striker that is provided at one of the reaction force plates, and the hook that is provided swingably at the other out of the reaction force plates and that is configured to anchor to the striker. The hook is configured to swing and be anchored to the striker after the reaction force plate provided with the striker and the reaction force plate provided with the hook have been pulled out. This thereby enables poor anchoring of the hook onto the striker to be prevented from occurring, and enables blocking movement toward the seat front side of the pulled out reaction force plate to be realized with a simple configuration.

Moreover, a lower limb restraint airbag device of a ninth aspect is the lower limb restraint airbag device of any one of the second to the eighth aspect, wherein the side walls are configured movably in the seat front-rear direction, with a rear end of the side walls disposed further toward a seat front side than a front end of a seat cushion of the vehicle seat while a vehicle is traveling, and with a front end of the side walls disposed either at a same position as, or further toward a seat rear side than, the front end of the seat cushion of the vehicle seat when a passenger is boarding or alighting.

In the lower limb restraint airbag device of the ninth aspect, the side walls are configured movably in the seat front-rear direction, the rear end of the side walls is disposed further toward the seat front side than the front end of the seat cushion of the vehicle seat while the vehicle is traveling, and the front end of the side walls is disposed either at the same position as or further toward the seat rear side than the front end of the seat cushion of the vehicle seat when a passenger is boarding or alighting. The lower limb restraint airbag device is accordingly placed on standby with certainty while the vehicle is traveling. Moreover, any impact on the ease of boarding or alighting of the passenger is reduced even in a configuration provided with side walls.

A lower limb restraint airbag device of a tenth aspect is the lower limb restraint airbag device of the ninth aspect, wherein the side walls are configured to move toward the seat front side in conjunction with reclining of a seatback of the vehicle seat.

In the lower limb restraint airbag device of the tenth aspect, the side walls are configured to move toward the seat front side in conjunction with reclining of a seatback of the vehicle seat. This means that even when the passenger has adopted a relaxed posture, the knees and the shins of the passenger are more certainly and effectively restrained than cases not adopting a configuration in which the side walls are moved toward the seat front side in conjunction with reclining of the seatback of the vehicle seat.

Moreover, a lower limb restraint airbag device of an eleventh aspect is the lower limb restraint airbag device of the ninth aspect, configured such that a seatback of the vehicle seat is not able to be reclined unless the rear end of the side walls is disposed further toward the seat front side than the front end of the seat cushion of the vehicle seat.

The lower limb restraint airbag device of the eleventh aspect is configured such that the seatback of the vehicle seat is not able to be reclined unless the rear end of the side walls is disposed further toward the seat front side than the front end of the seat cushion of the vehicle seat. This means that the knees and the shins of the passenger are certainly and effectively restrained even when the passenger has adopted a relaxed posture.

A lower limb restraint airbag device of a twelfth aspect is the lower limb restraint airbag device of the first aspect, wherein the inflator, the airbag, the reaction force plate, and the lock mechanism are installed at a lower section of an instrument panel.

In the lower limb restraint airbag device of the twelfth aspect, the inflator, the airbag, the reaction force plate, and the lock mechanism are installed at the lower section of the instrument panel. This means that, for example, the knees of the passenger are still effectively restrained even in cases in which the length along the seat height direction (thickness) of a rear end portion of the instrument panel has been reduced and there is a wide space present at the seat front side of the knees of a passenger seated in a vehicle seat.

A lower limb restraint airbag device of a thirteenth aspect is the lower limb restraint airbag device of the twelfth aspect, wherein the reaction force plate is swingably supported by the lower section of the instrument panel and is linked to the airbag by a strap.

In the lower limb restraint airbag device of the thirteenth aspect, the reaction force plate is swingably supported by the lower section of the instrument panel and is linked to the airbag by the strap. Thus pull out of the reaction force plate in conjunction with the inflation and deployment of the airbag can be realized with a simple configuration.

A lower limb restraint airbag device of a fourteenth aspect is the lower limb restraint airbag device of the thirteenth aspect, wherein the lock mechanism includes a lock bar having a one-end portion that is slidably retained in a guide groove formed at the lower section of the instrument panel and having an other-end portion swingably attached to the reaction force plate, and the guide groove includes a recess that immovably houses the one-end portion of the lock bar after the reaction force plate has been pulled out.

In the lower limb restraint airbag device of the fourteenth aspect, the lock mechanism includes the lock bar having the one-end portion that is slidably retained in the guide groove formed at the lower section of the instrument panel and having the other-end portion swingably attached to the reaction force plate. The guide groove includes the recess that immovably houses the one-end portion of the lock bar after the reaction force plate has been pulled out. Thus blocking movement toward the seat front side of the pulled out reaction force plate can be realized with a simple configuration.

As described above, according to the present disclosure, knees of a passenger seated in a vehicle seat can be effectively restrained even in cases in which there is a wide space present at a seat front side of the knees of the passenger.

BRIEF DESCRIPTION OF THE DRAWINGS

Exemplary embodiments of the present disclosure will be described in detail based on the following figures, wherein:

FIG. 7 is a schematic plan view illustrating a deployed state of a lower limb restraint airbag device according to a second exemplary embodiment;

FIG. 8A, FIG. 8B, and FIG. 8C are enlarged schematic plan views illustrating operation of a lock mechanism in a lower limb restraint airbag device according to the second exemplary embodiment;

DETAILED DESCRIPTION

Figure 1:
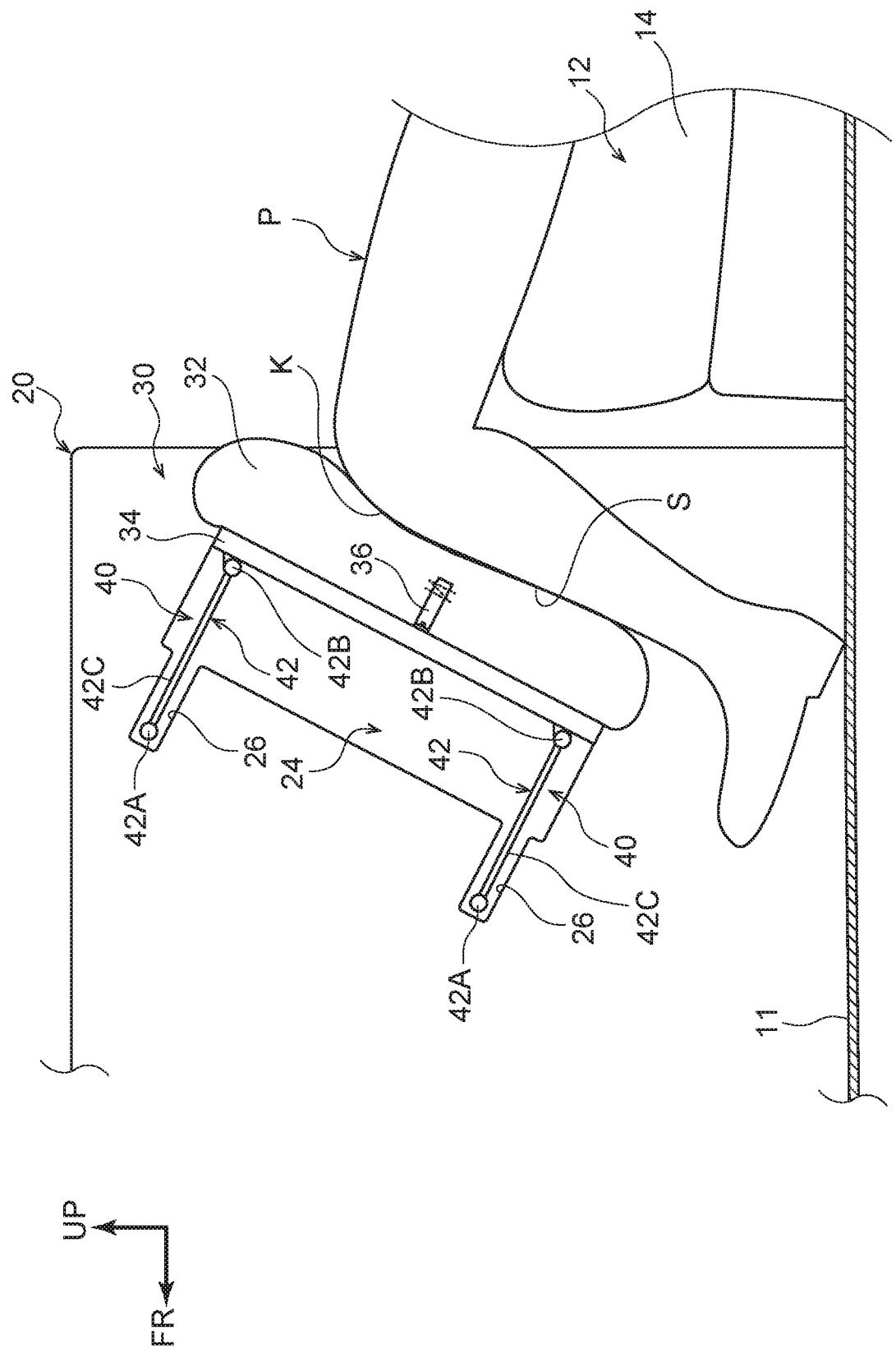
FIG. 1 is a schematic side view illustrating a deployed state of a lower limb restraint airbag device according to a first exemplary embodiment.
Figure 2:
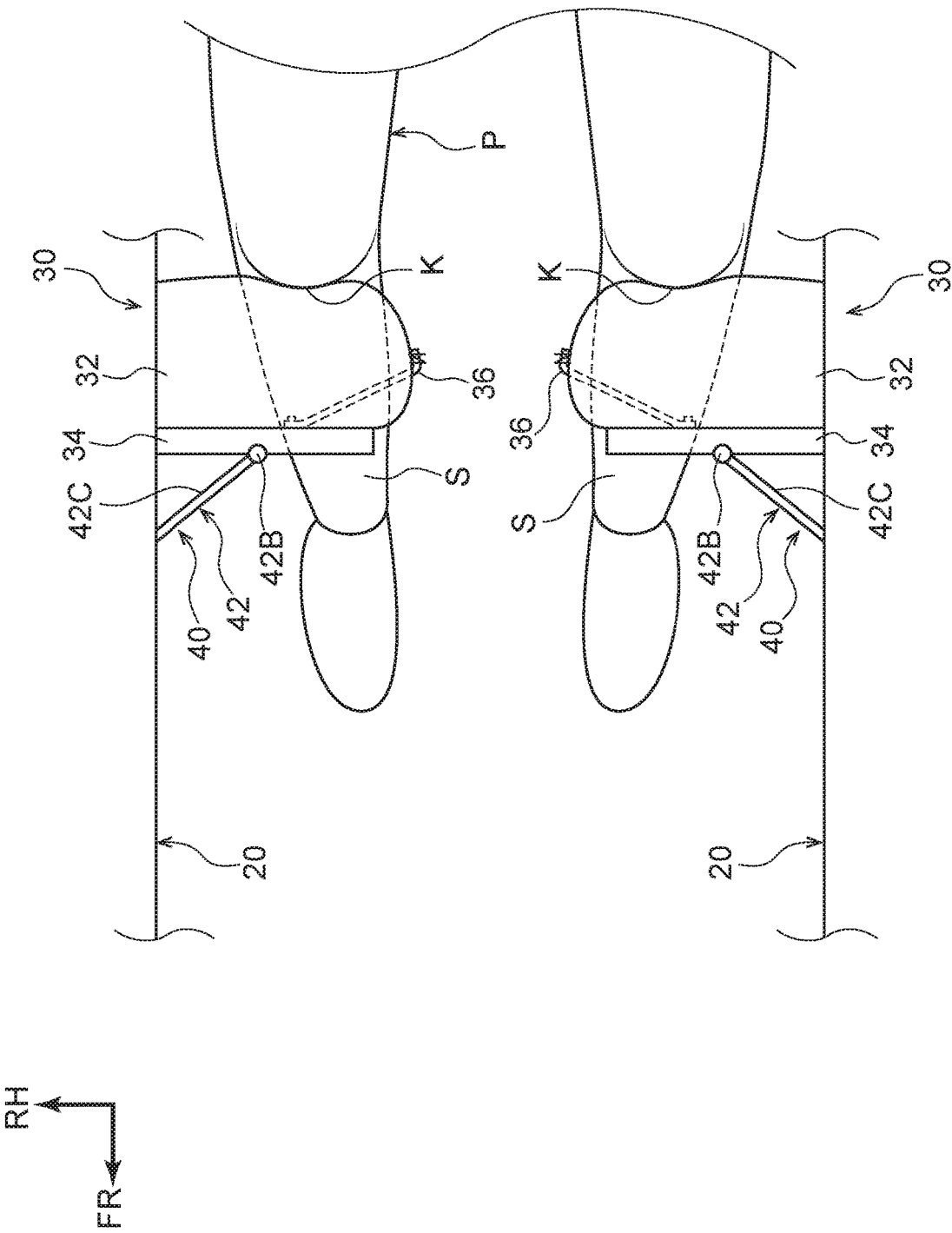
FIG. 2 is a schematic plan view illustrating a deployed state of a lower limb restraint airbag device according to the first exemplary embodiment.
Figure 3:
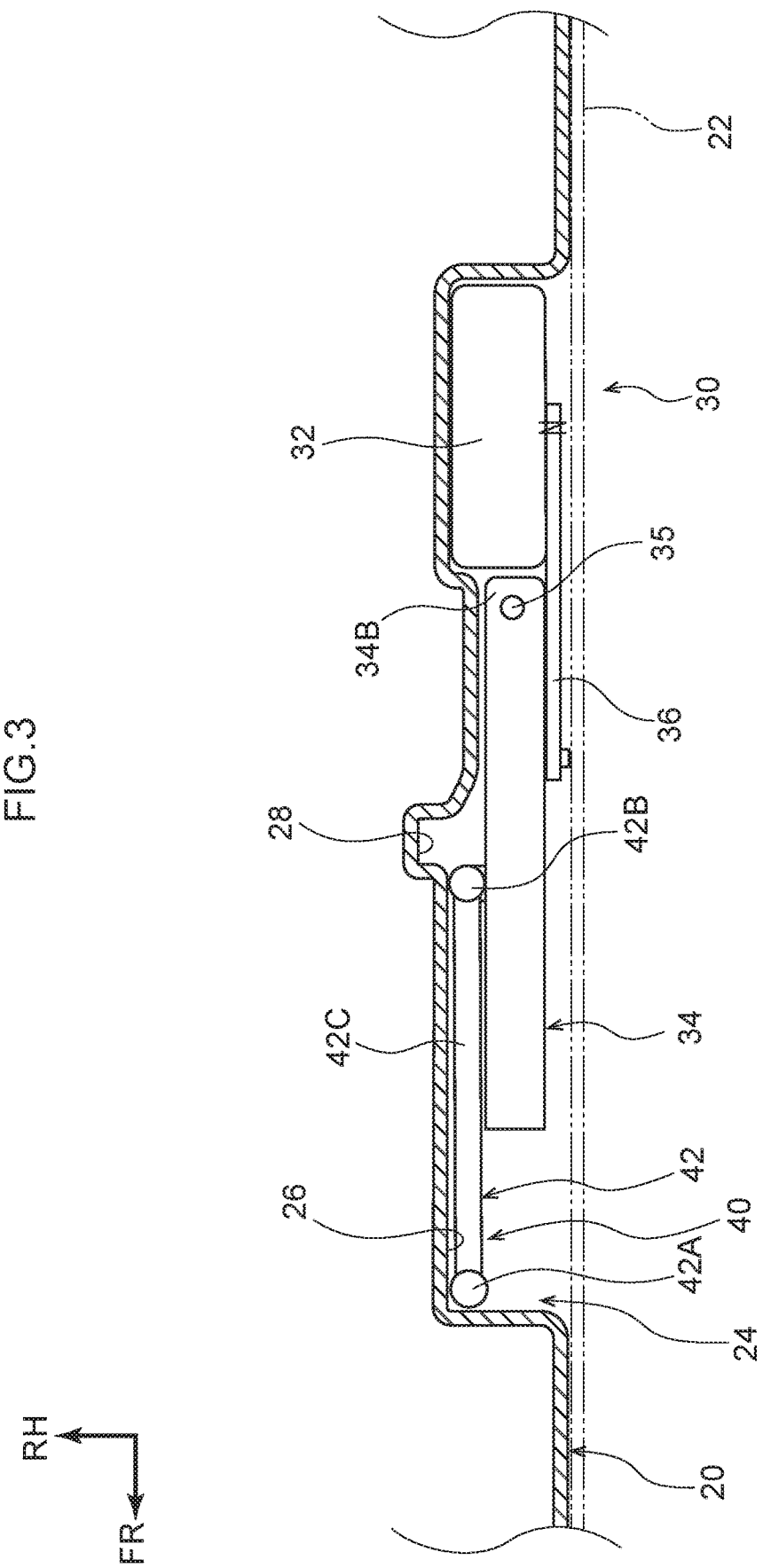
FIG. 3 is an enlarged schematic plan view illustrating a right knee lower limb restraint airbag device according to the first exemplary embodiment prior to deployment.
Figure 4:
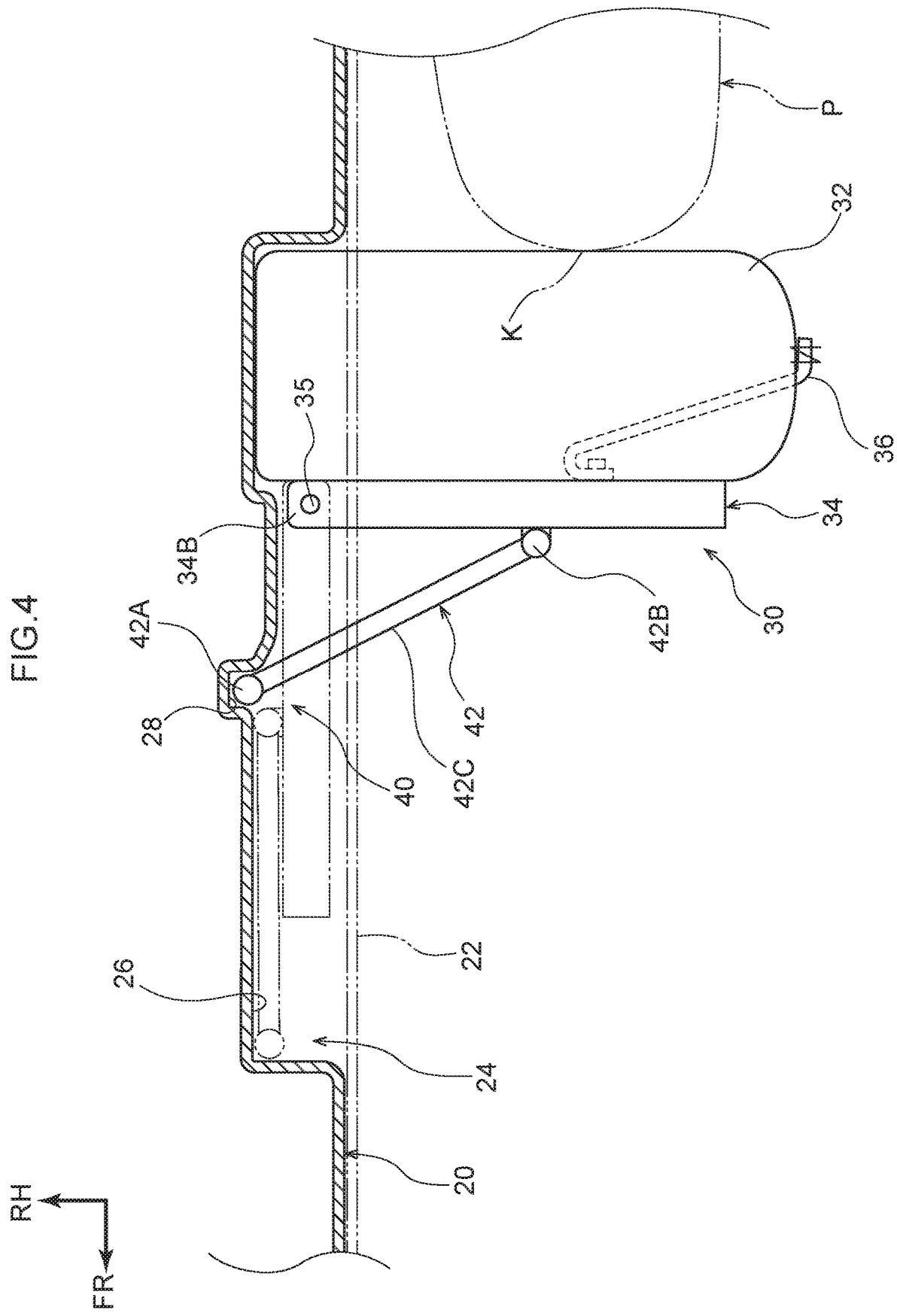
FIG. 4 is an enlarged schematic plan view illustrating a right knee lower limb restraint airbag device according to the first exemplary embodiment after deployment.

Detailed explanation follows regarding exemplary embodiments according to the present disclosure, with reference to the drawings. Note that for ease of explanation, where appropriate in the drawings an arrow UP indicates an upward direction of a vehicle and a vehicle seat, an arrow FR indicates a forward direction of a vehicle and a vehicle seat, and an arrow RH indicates a right direction of a vehicle and a vehicle seat. Thus in the following description, unless specifically stated otherwise, reference to up-down (height), front-rear, and left-right directions indicate up-down (height), front-rear, and left-right directions of a vehicle and a vehicle seat. Moreover, the left-right direction means the same as a vehicle width direction and a seat width direction. Moreover, a front seat of a vehicle (automobile) is adopted as an example of a vehicle seat according to the present exemplary embodiments.

First Exemplary Embodiment

Figure 5:
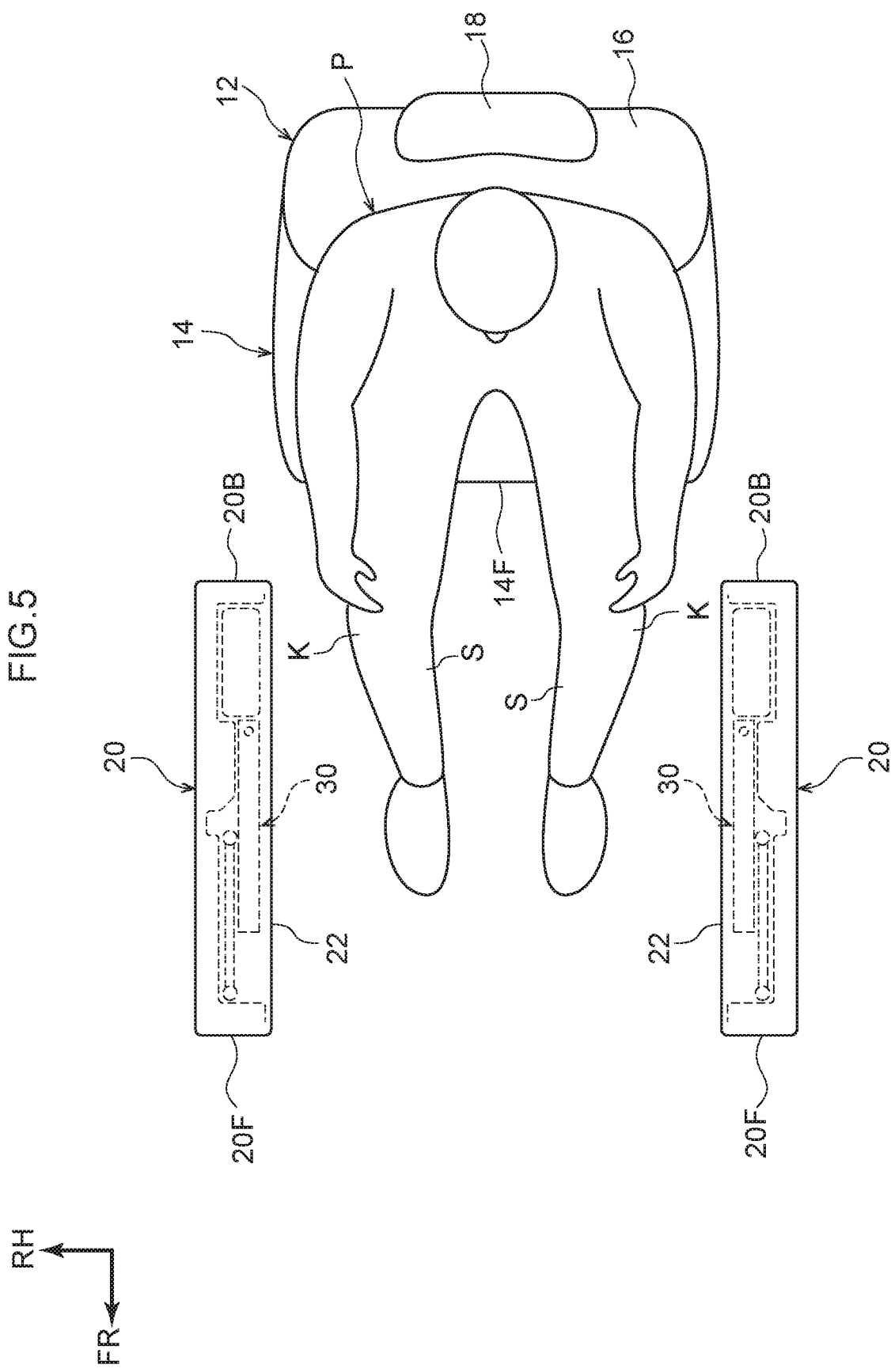
FIG. 5 is a schematic plan view illustrating a state of side walls provided to a lower limb restraint airbag device according to the first exemplary embodiment during travel.
Figure 6:
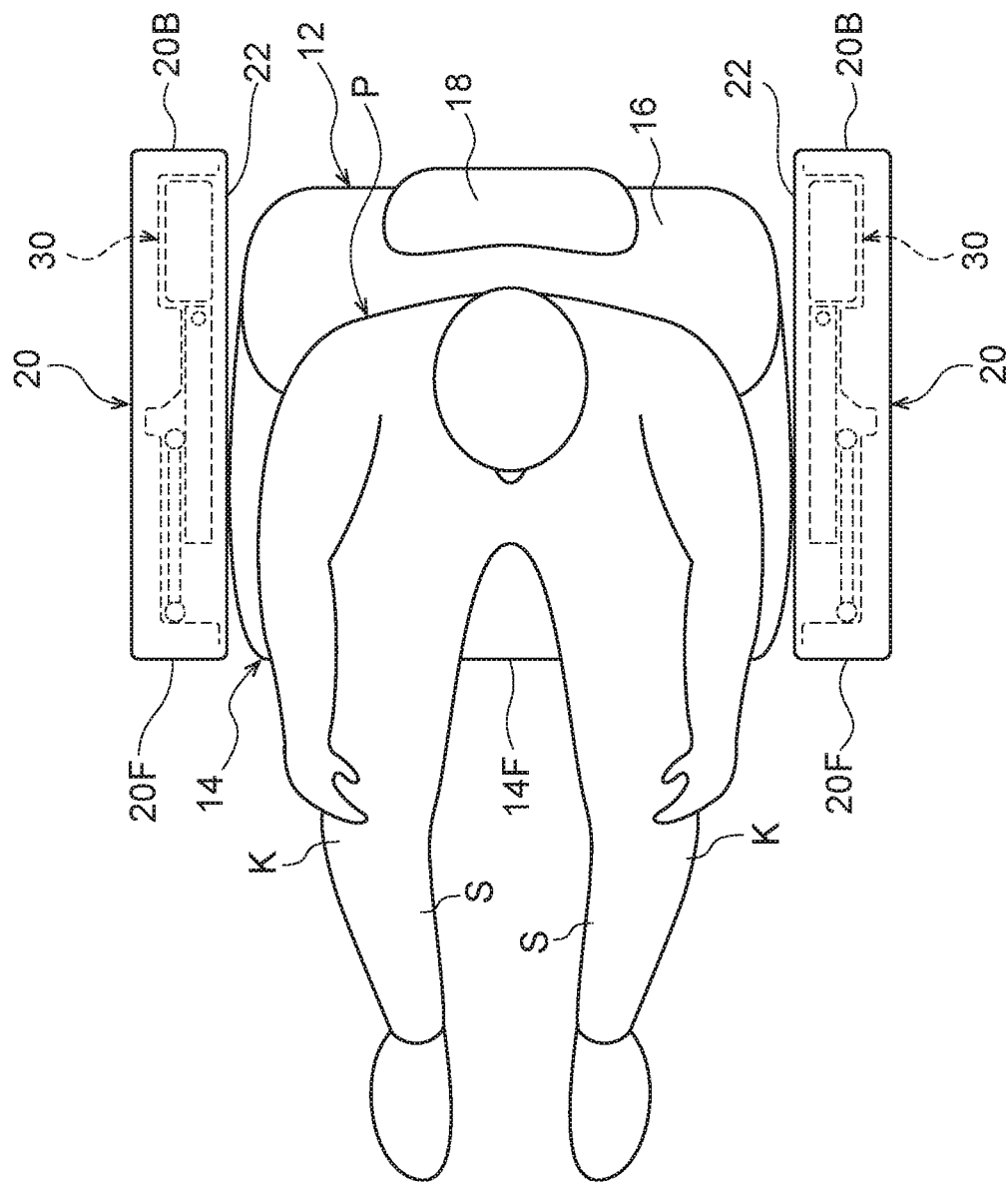
FIG. 6 is a schematic plan view illustrating a state of side walls provided to a lower limb restraint airbag device according to the first exemplary embodiment during boarding or alighting.

First description follows regarding a first exemplary embodiment. As illustrated in FIG. 5 and FIG. 6, a vehicle seat 12 provided as a front seat of a vehicle 10 (see FIG. 10) includes a seat cushion 14 for a passenger to sit on (supporting the buttocks and thighs of the passenger), a seatback 16 that is provided swingably at a rear side of the seat cushion 14 with the seat width direction as an axial direction and supporting the back of the passenger, and a headrest 18 that is provided at an upper end portion of the seatback 16 and is capable of being raised and lowered to support the head of the passenger. Note that the seatback 16 is configured so as to be able be tilted (reclined or tilted forward) using a known electric mechanism (omitted in the drawings).

Moreover, as illustrated in FIG. 5, FIG. 6, and the like, a crash test dummy (dummy person) serving as a model of a passenger (seated person) is illustrated in a seated state on the seat cushion 14 of the vehicle seat 12. The dummy person is, for example, a head-on collision crash test dummy (Hybrid III) America Adult Male 50 percentile (AM50). The dummy person is seated in a standard seated posture as stipulated by the crash test method, and the vehicle seat 12 is positioned at the standard set position corresponding to the seated posture. The dummy person is referred to as "passenger P" below.

As illustrated in FIG. 5 and FIG. 6, a left-right pair of side walls 20 formed in substantially rectangular shapes in side view are provided at left and right sides of the vehicle seat 12 so as to be capable of moving in the front-rear direction. More specifically, rails (omitted in the drawings) similar to seat rails (omitted in the drawings) for supporting the seat cushion 14 of the vehicle seat 12 are provided on a floor 11 (see FIG. 1, FIG. 10) of the vehicle 10 at the left and right sides of the vehicle seat 12 so as to enable sliding in the front-rear direction.

A bottom portion of each of the side walls 20 is fitted so as to be able to slide to the respective rails. Note that a rear end portion of each of the rails may be configured so as to be integrally supported at a front end portion of each seat rail. Moreover, the configurations of the left-right pair of side walls 20 are configurations that are left-right symmetrically the same as each other, and so sometimes only the side wall 20 on one side will be described below.

As illustrated in FIG. 5, each of the side walls 20 is configured such that a rear end 20B thereof is disposed further toward the front side than a front end 14F of the seat cushion 14 of the vehicle seat 12 during travel of the vehicle 10. As illustrated in FIG. 6, the side walls 20 are each configured such that a front end 20F thereof is disposed either at the same position as, or at a rear side of, the front end 14F of the seat cushion 14 of the vehicle seat 12 when the passenger P is boarding or alighting.

More specifically, an electric motor (omitted in the drawings), and a pinion (omitted in the drawings) rotationally driven by the electric motor, are provided at a length direction one-end portion side of rails slidably supporting each of the side walls 20. A rack (omitted in the drawings) meshed with the pinion is provided to a bottom portion of each of the side walls 20.

Furthermore, the electric motor is electrically connected to a control device (omitted in the drawings) installed to the vehicle 10. This means that when travel of the vehicle 10 is detected by the control device (including a sensor and the like), the electric motor is driven under control of the control device, each of the side walls 20 is moved toward the front side, and the rear end 20B thereof is disposed further toward the front side than the front end 14F of the seat cushion 14.

Then when boarding or alighting of a passenger P is determined by the control device (including a sensor and the like) detecting release of a lock of a side door (omitted in the drawings), the electric motor is driven under control of the control device, each of the side walls 20 is moved toward the rear side, and the front end 20F thereof is disposed either at the same position as, or further toward the rear side than, the front end 14F of the seat cushion 14. Note that a configuration may be adopted in which only the side wall 20 on the side door side is moved.

Moreover, a configuration may be adopted in which each of the side walls 20 is moved toward the front side in conjunction with the seatback 16 of the vehicle seat 12 being reclined by a specific angle or greater. More specifically, a sensor (omitted in the drawings) to detect an angle of the seatback 16 is provided to the vehicle 10, and the sensor is electrically connected to the control device.

In such a configuration, the electric motor is driven under control of the control device when reclining of the seatback 16 by the specific angle or greater is detected by the sensor, the side walls 20 are moved toward the front side, and the rear ends 20B thereof are disposed further toward the front side than the front end 14F of the seat cushion 14.

Moreover, a configuration may be adopted in which the seatback 16 of the vehicle seat 12 is not able to be reclined unless each of the side walls 20 is disposed with the rear ends 20B further toward the front side than the front end 14F of the seat cushion 14 of the vehicle seat 12. More specifically, sensors (omitted in the drawings) to detect positions of each of the side walls 20 are provided to the vehicle 10, and these sensors are electrically connected to the control device.

In such a configuration, the passing of current through an electric drive mechanism is blocked under control of the control device unless the rear end 20B of the left and right side walls 20 is detected by the sensors as being disposed further toward the front side than the front end 14F of the seat cushion 14, and reclining of the seatback 16 is not permitted. Note that configuration may be adopted such that a warning alarm is generated if the travel speed of the vehicle 10 exceeds a specific speed and the left and right side walls 20 continue to be disposed toward the rear side when the seatback 16 is reclined or when a seatbelt (omitted in the drawings) is not being worn.

As illustrated in FIG. 1 to FIG. 4, a housing recess 24 is formed at each inside face of the left-right pair of side walls 20 where they oppose each other (face toward the seat width direction inside), with each of the housing recesses 24 having a respective specific shape and size. Inflators (omitted in the drawings) and lower limb restraint airbag devices 30 are installed (housed) in each of the housing recesses 24.

Namely, an inflator and a lower limb restraint airbag device 30 for a right knee of the passenger P are installed to the side wall 20 on the right side, and an inflator and a lower limb restraint airbag device 30 for a left knee of the passenger P are installed to the side wall 20 on the left side (see FIG. 5 and FIG. 6). Note that each of the side walls 20 is normally covered by a surface skin 22 (see FIG. 3 to FIG. 6), such that the inflators and the lower limb restraint airbag devices 30 are housed inside the housing recess 24 and not visible externally.

The inflators are, for example, combustion cylinder type inflators, and are electrically connected to the control device. The inflators are accordingly configured so as to generate high temperature gas by being actuated by the control device during a head-on collision of the vehicle 10. Note that reference here to during a head-on collision of the vehicle 10 encompasses both when a head-on collision of the vehicle 10 has been detected, and when the inevitability of a head-on collision of the vehicle 10 has been foreseen (hereafter referred to as "predicted"). Moreover, a head-on collision state of the vehicle 10 when the control device actuates the inflators encompasses offset head-on collisions, such as oblique collisions and small overlap collisions, in addition to full overlap head-on collisions.

The lower limb restraint airbag devices 30 installed to the side walls 20 include airbags 32 that are inflated and deployed toward knees K and shins S of the passenger P seated in the vehicle seat 12 (rupturing the surface skin 22) by gas ejected from the inflators, and that make contact with at least the knees K from the front side (more precisely from obliquely above at the front side).

The left and right airbags 32 are formed, for example, from a polyamide or polyester base cloth (fabric) at a size so as to be able to at least approximately cover the respective left and right knees K and shins S of the passenger P from the front side (more precisely from obliquely above at the front side). The left and right airbags 32 are housed in the housing recess 24 in a folded state folded in a specific manner.

The lower limb restraint airbag devices 30 include reaction force plates 34 that can be pulled out to the front side (more precisely to obliquely upward at the front side) of the airbags 32 in conjunction with the inflation and deployment of the airbags 32, and lock mechanisms 40 to block movement of the pulled-out reaction force plates 34 toward the front side (more precisely obliquely upward toward the front side) (i.e. to fix the reaction force plates 34 that have been pulled out at those positions).

The reaction force plates 34 are, for example, made from a resin having a degree of hardness, formed into substantially rectangular plate shapes having a specific thickness. The reaction force plates 34 are housed in the housing recesses 24 further toward the front side (more precisely obliquely upward toward the front side) than the airbags 32, and rear end portions 34B thereof are each supported through a swing shaft 35 by the side wall 20 so as to be able to swing, the swing shaft 35 is disposed with its axial direction substantially along the height direction (more precisely a direction inclined at a specific angle with respect to the height direction in side view).

Note that hereafter faces facing toward the seat width direction inside of the reaction force plates 34 when in a housed state in the housing recess 24 will be referred to as "inner faces", and the faces thereof that face toward the seat width direction outside will be referred to as "outer faces". Substantially central portions of the inner faces of the reaction force plates 34 are connected by straps 36 to specific sites on the airbags 32 (sites facing toward the seat width direction inside when inflated and deployed).

The lock mechanisms 40 are each configured including an up-down pair of lock bars 42 having a one-end portion 42A slidably retained in a guide groove 26 formed in the housing recess 24 of the side wall 20, and an other-end portion 42B swingably attached to the outer face of the reaction force plates 34. Each of the lock bars 42 includes a main body 42C formed in a circular pillar shape, with the one-end portion 42A and the other-end portion 42B of the lock bars 42 each formed with a spherical bulge shape. Namely, diameters of the one-end portion 42A and the other-end portion 42B of the lock bars 42 are greater than the diameter of the main body 42C of the lock bars 42.

The up-down pair of guide grooves 26 extend from a site where the reaction force plates 34 are housed toward the front side (more precisely obliquely upward toward the front side), with the width of each of the guide grooves 26 being formed either the same diameter as, or slightly larger than, the diameter of the one-end portion 42A of the lock bars 42. A jutting out portion (omitted in the drawings) that narrows a groove width to the same width as the diameter of the main body 42C of each of the lock bars 42 is integrally formed to a peripheral edge portion at the opening side (seat width direction inside) of the guide groove 26.

This means that the one-end portion 42A of each of the lock bars 42 is configured to be slidably retained by this jutting out portion while not coming out from the respective guide groove 26. A recess 28 is integrally formed at a specific site on each of the guide grooves 26 such that the respective one-end portion 42A of each of the lock bars 42 is housed immovably therein (sinks therein) after the respective reaction force plate 34 has been pulled out. This results in a configuration in which the reaction force plate 34 is supported by the up-down pair of lock bars 42 and locked so as to not to be able to move toward the front side.

Description next follows regarding operation and effects of the lower limb restraint airbag devices 30 according to the first exemplary embodiment configured as described above.

The inflators are actuated and eject gas when a head-on collision of the vehicle 10 has been detected or predicted. The airbags 32 are inflated and deployed toward the knees K and the shins S of the passenger P seated in the vehicle seat 12 by the gas ejected from the inflators, and make contact with at least the knees K. The airbags 32 are linked to the reaction force plates 34 through the straps 36.

This means that the reaction force plates 34 are swung about the swing shafts 35 provided to the rear end portions 34B thereof in conjunction with the inflation and deployment of the airbags 32, and are pulled out to the front side of the airbags 32. The movement of the pulled-out reaction force plates 34 toward the front side is blocked by the lock mechanisms 40 (the reaction force plates 34 are fixed). Namely, the reaction force plates 34 form reaction force surfaces against the airbags 32.

This means that load from the knees K and the shins S of the passenger P attempting to move toward the front side under inertia can be effectively borne by the airbags 32 supported by the reaction force plates 34. This means that the knees K of the passenger P can still be effectively restrained (in particular sufficient restraining force can be secured at a collision initial-stage) even when there is a wide space present at a seat front side of the knees K of the passenger P seated in the vehicle seat 12, such as when the vehicle seat 12 has been moved greatly toward the rear (i.e. is far away from a reaction force surface such as the instrument panel or the like).

Moreover, the knees K of the passenger P can be effectively restrained even in cases in which the passenger P seated in the vehicle seat 12 is not wearing a seatbelt, or the passenger P is wearing a seatbelt but is not sufficiently restrained by a lap belt of the seatbelt due to being in relaxed posture with the seatback 16 greatly reclined.

Note that the knees K of the passenger P do not make direct contact with the reaction force plates 34 when the airbags 32 are inflated and deployed due to adopting the configuration in which the airbags 32 are interposed between the reaction force plates 34 and the knees K of the passenger P. This thereby enables shock from the reaction force plates 34 to the knees K of the passenger P to be suppressed to a minimal amount or prevented.

Moreover, the inflators, the airbags 32, the reaction force plates 34, and the lock mechanisms 40 configured for the right knee and the left knee of the passenger P are respectively installed to the pair of side walls 20 disposed at the left and right sides of the vehicle seat 12. This means that, for example, enabling improper restraint for either the left knee or the right knee of the passenger P to be suppressed from occurring compared to a configuration in which a side wall 20 is disposed on only one of the left or right sides, and the left and right knees K of the passenger P are restrained by a single airbag (omitted in the drawings).

Moreover, as described above, the reaction force plates 34 are swingably supported by the side wall 20 through the swing shafts 35 and are linked to the airbags 32 by the straps 36. This means that pull out of the reaction force plates 34 in conjunction with the inflation and deployment of the airbags 32 can be realized with a simple configuration.

Furthermore, the lock mechanisms 40 include the up-down pair of lock bars 42, having the one-end portion 42A slidably retained in the guide groove 26 formed at the side wall 20 and having the other-end portion 42B swingably attached to the reaction force plates 34. Each of the guide grooves 26 includes the recess 28 that houses the one-end portion 42A of each of the respective lock bars 42 so as to be immovable after the reaction force plate 34 has been pulled out. This thereby enables blocking of movement of the pulled-out reaction force plates 34 toward the front side (fixing of the reaction force plates 34) to be realized with a simple configuration.

Moreover, the side walls 20 are each configured so as to be movable in the front-rear direction, with the rear end 20B thereof disposed further toward the front side than the front end 14F of the seat cushion 14 of the vehicle seat 12 when the vehicle 10 is traveling. This means that while the vehicle 10 is traveling the lower limb restraint airbag devices 30 can be placed on standby with certainty.

Moreover, the front end 20F of each of the side walls 20 is disposed either at the same position as, or further toward the rear side than, the front end 14F of the seat cushion 14 of the vehicle seat 12 when the passenger P is boarding or alighting. This means that even in the configuration where the side walls 20 are provided, any impact on the ease of boarding or alighting the vehicle 10 by the passenger P can be reduced.

Note that, as described above, the side walls 20 may be configured so as to move toward the front side in conjunction with reclining of the seatback 16 of the vehicle seat 12. Adopting such an approach enables the lower limb restraint airbag devices 30 to be placed on standby more certainly when the passenger P has adopted a relaxed posture than cases in which the side walls 20 are not configured so as to move toward the front side in conjunction with reclining of the seatback 16 of the vehicle seat 12, thereby enabling the knees K and the shins S of the passenger P to be certainly and effectively restrained.

Moreover, as described above, configuration may be adopted such that the seatback 16 of the vehicle seat 12 is not able to be reclined unless the rear ends 20B of the side walls 20 are disposed further toward the front side than the front end 14F of the seat cushion 14 of the vehicle seat 12. This thereby enables the lower limb restraint airbag devices 30 to be placed on standby with certainty when the passenger P is adopting a relaxed posture, enabling the knees K and the shins S of the passenger P to be certainly and effectively restrained.

Second Exemplary Embodiment

Next, description follows regarding a second exemplary embodiment. Note that the same reference numerals will be appended to locations equivalent to those of the first exemplary embodiment and detailed explanation thereof will be omitted (including of common operation and effects).

As illustrated in FIG. 7, FIG. 8A, FIG. 8B, FIG. 8C, the second exemplary embodiment differs from the first exemplary embodiment in the configuration of the lock mechanisms 40. Namely, instead of the up-down pair of lock bars 42 and the recesses 28, these lock mechanisms 40 are configured including a striker 44 that is provided at a front end portion 34F of the outer face of one of the reaction force plates 34R (for example on the right side) and a hook 46 that is provided at a front end portion 34F of the outer face of the other of the reaction force plates 34L (for example on the left side).

The striker 44 is formed in a substantially C-shape in side view, and is integrally attached at a substantially height direction center portion of the right side reaction force plate 34R that opposes the right side knee K of the passenger P through the airbag 32. The hook 46 is formed in a substantially s-shape in plan view and is integrally attached at a substantially height direction center portion of the left side reaction force plate 34L that opposes the left side knee K of the passenger P through the airbag 32.

As illustrated by the arrow in FIG. 8A, this hook 46 is configured so as to be able to anchor onto the striker 44 from the front side. Namely, a claw 46A configuring the leading end portion of the hook 46 is formed with an unciform shape in plan view so as to not to come away from a circular column portion 44A of the striker 44 that extends in substantially the height direction. A configuration is adopted in which the claw 46A enters inside (to the right side reaction force plate 34R side) of the circular column portion 44A of the striker 44 from the front right side thereof, as illustrated in FIG. 8B, so as to become anchored to the circular column portion 44A, as illustrated in FIG. 8C.

This results in a configuration in which that the left side reaction force plate 34L provided with the hook 46 swings delayed (imparted with a timing difference) relative to the right side reaction force plate 34R provided with the striker 44. More specifically, the left side reaction force plate 34L provided with the hook 46 is configured heavier than the right side reaction force plate 34R provided with the striker 44 (a difference in inertial moment is induced therebetween). This thereby enables poor anchoring of the hook 46 onto the striker 44 to be prevented from occurring.

The right side reaction force plate 34R and the left side reaction force plate 34L can be fixed by the hook 46 being anchored to the striker 44, enabling reaction force surfaces against the respective airbags 32 to be formed by the right side reaction force plate 34R and the left side reaction force plate 34L. Namely, the left and right knees K of the passenger P can be restrained with certainty by the respective airbags 32 supported by the right side reaction force plate 34R and the left side reaction force plate 34L.

Delaying (with a time difference) the swinging of the left side reaction force plate 34L provided with the hook 46 relative to the right side reaction force plate 34R provided with the striker 44, and blocking movement toward the front side of the pulled-out right side reaction force plate 34R and left side reaction force plate 34L (fixing of the right side reaction force plate 34R and the left side reaction force plate 34L), can be realized with a simple configuration.

Note that a configuration in which the left side reaction force plate 34L provided with the hook 46 is delayed (has a time difference) relative to the right side reaction force plate 34R provided with the striker 44 is not limited to the configuration described above.

For example, a configuration may be adopted in which an ignition timing of the inflator that ejects gas into the airbag 32 on the left side linked by the strap 36 to the left side reaction force plate 34L provided with the hook 46 is delayed relative to an ignition timing of the inflator that ejects gas into the airbag 32 on the right side linked by the strap 36 to the right side reaction force plate 34R provided with the striker 44. Adopting such an approach enables swinging of the left side reaction force plate 34L provided with the hook 46 delayed (with a time difference) relative to the right side reaction force plate 34R provided with the striker 44 to be realized with good precision using a simple configuration.

Figure 9:
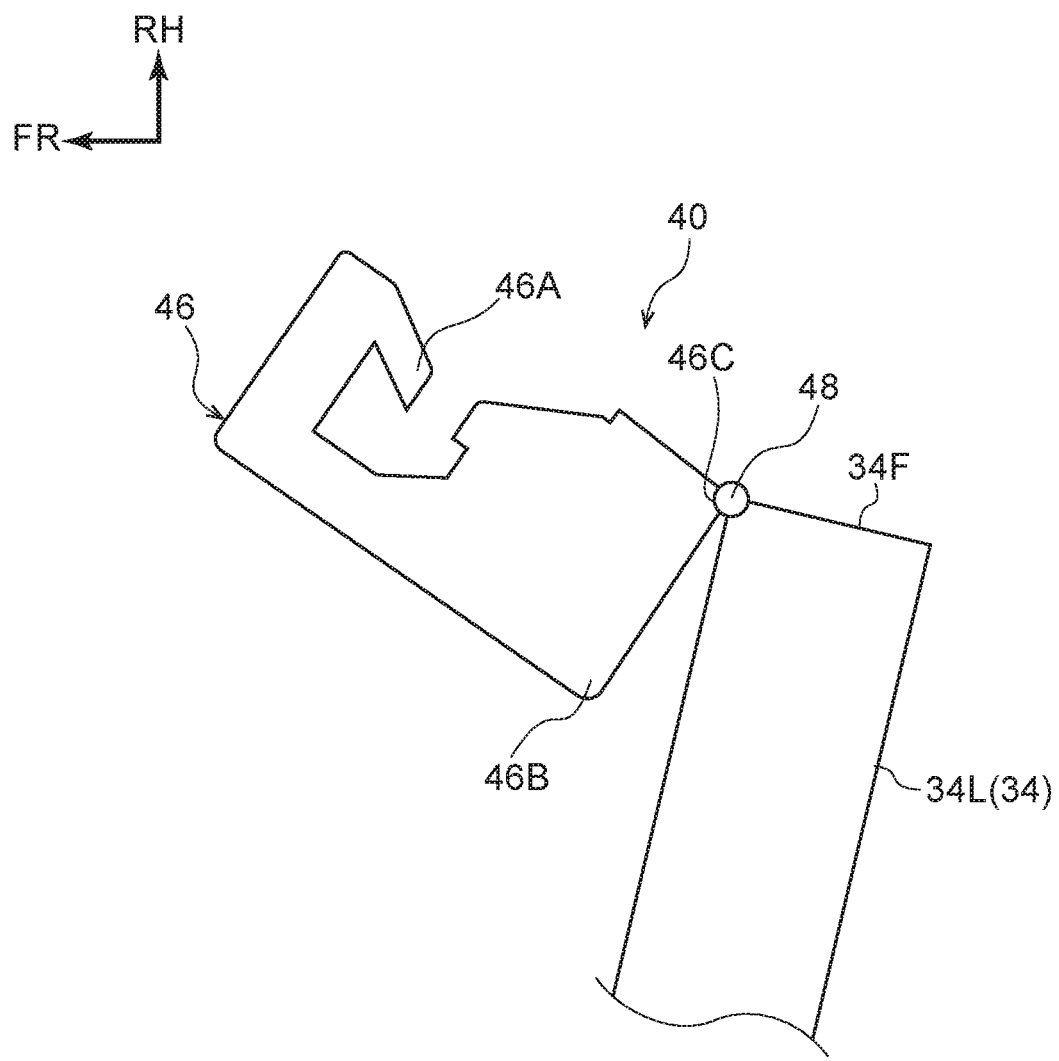
FIG. 9 is an enlarged schematic plan view illustrating a modified example of a lock mechanism of a lower limb restraint airbag device according to the second exemplary embodiment.

Moreover, for example as illustrated in FIG. 9, a hook 46 may be provided so as to be able to swing with respect to the left side reaction force plate 34L. Namely, a corner portion 46C on the left side reaction force plate 34L side of a base portion 46B of a hook 46 can be supported so as to be able to swing by the front end portion 34F of the outer face of the left side reaction force plate 34L through a swing shaft 48 that has an axial direction along substantially the height direction. A configuration may be adopted in which, after the right side reaction force plate 34R provided with the striker 44 and the left side reaction force plate 34L provided with the hook 46 have been pulled out, the hook 46 swings around the swing shaft 48 and is anchored to the striker 44 by the force from the inertia of this pulling out action.

Adopting such an approach enables improper anchoring of the hook 46 to the striker 44 to be prevented from occurring (enables the hook 46 to be easily anchored to the striker 44), and also blocking movement toward the front side of the pulled-out right side reaction force plate 34R and left side reaction force plate 34L (fixing of the right side reaction force plate 34R and the left side reaction force plate 34L), to be realized with a simple configuration.

Third Exemplary Embodiment

Finally description follows regarding a third exemplary embodiment. Note that the same reference numerals will be appended to locations equivalent to those of the first exemplary embodiment and detailed explanation thereof will be omitted (including of common operation and effects).

Figure 10:
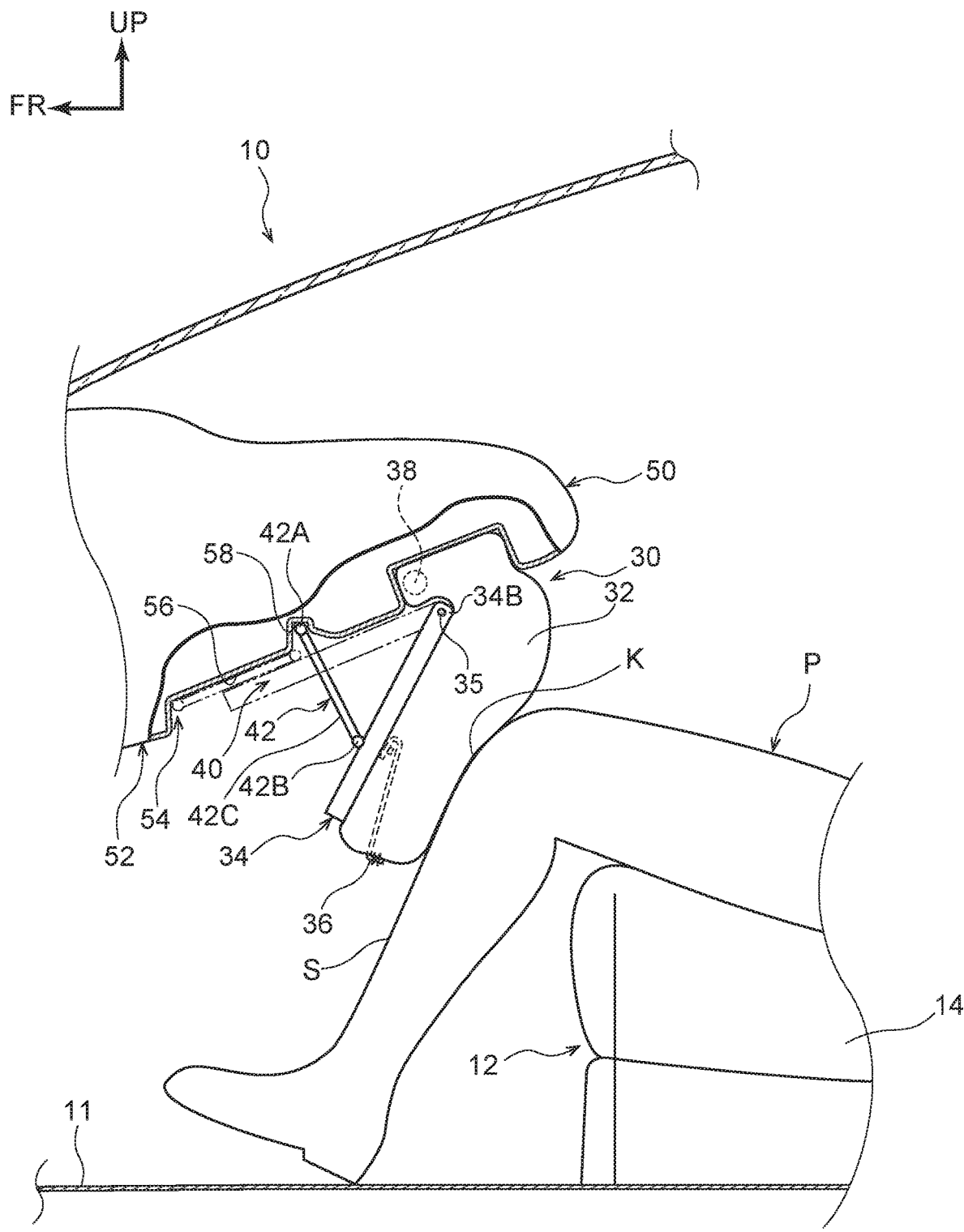
FIG. 10 is a schematic side view illustrating a deployed state of a lower limb restraint airbag device according to a third exemplary embodiment.

As illustrated in FIG. 10, the third exemplary embodiment differs from the first exemplary embodiment in being configured without inflators 38, airbags 32, reaction force plates 34, and lock mechanisms 40 being provided to a left-right pair of side walls 20, and instead a single airbag 32 is installed to a lower section 52 of an instrument panel 50, so as to restrain the left and right knees K and the shins S of the passenger P.

The size of the airbag 32 is accordingly formed larger in the left-right direction than the airbags 32 of the first exemplary embodiment and the second exemplary embodiment so as to be able to restrain the left and right knees K and the shins S of the passenger P. The instrument panel 50 is configured as a so-called thin instrument panel with a length along the height direction (thickness) in side view reduced more than a length along the front-rear direction, such that there is a wide space present at the front side of the knees K of the passenger P seated on the vehicle seat 12.

A housing recess 54 similar to the housing recess 24 is formed at the lower section 52 of the instrument panel 50, and the housing recess 54 is covered by a non-illustrated cover. This means that the lower limb restraint airbag device 30 and the like housed inside the housing recess 54 are not normally visible externally. Note that this cover is configured so as to be ruptured by inflation force when the airbag 32 is being inflated and deployed so as not to impede inflation and deployment of the airbag 32.

The rear end portion 34B of the reaction force plate 34 is supported so as to be able to swing at a rear side of the lower section 52 of the instrument panel 50 by a swing shaft 35 having an axial direction along the left-right direction, with a substantially central portion of the lower face of the reaction force plate 34 linked by a strap 36 to a substantially left-right direction central portion of a lower end portion of the airbag 32 when inflated and deployed.

Figure 11A:
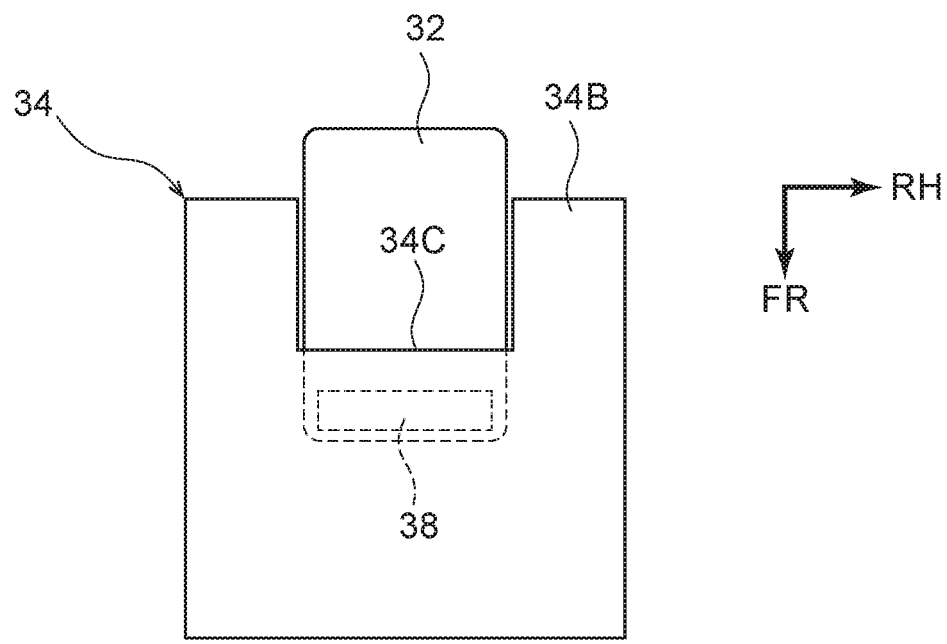
FIG. 11A is a schematic bottom view illustrating a lower limb restraint airbag device according to the third exemplary embodiment prior to deployment.
Figure 11B:
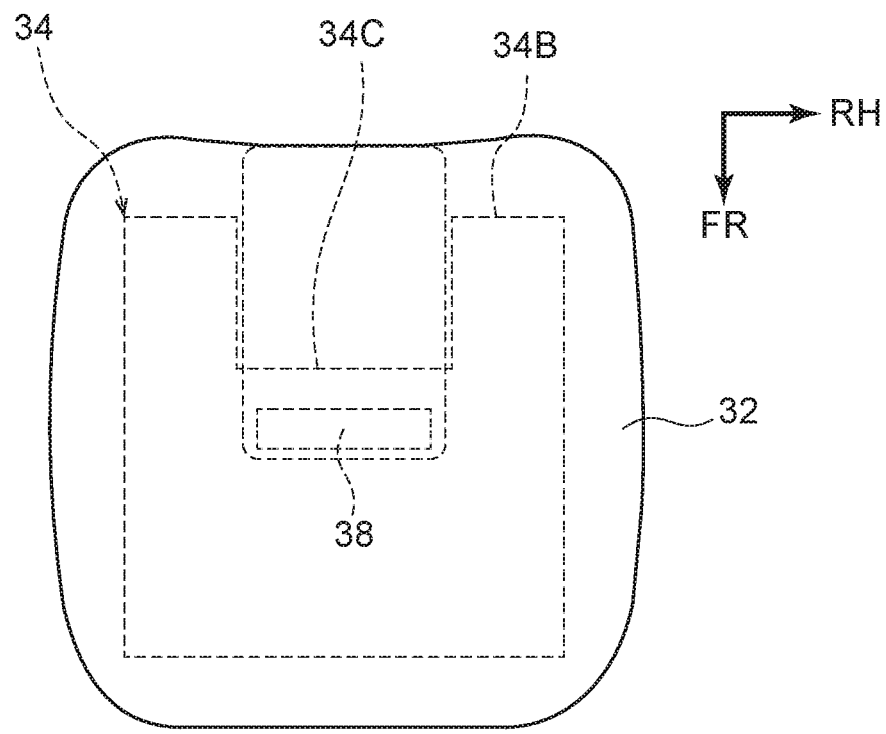
FIG. 11B is a schematic bottom view illustrating a lower limb restraint airbag device according to the third exemplary embodiment after deployment.

As illustrated in FIG. 11A and FIG. 11B, the reaction force plate 34 is formed in a substantially "square-cornered U-shape" as viewed from below, with the folded-up airbag 32 disposed so as to overlap with a rectangular shaped notched portion 34C formed at a left-right direction central portion of the rear end portion 34B as viewed from below. This results in a configuration in which the reaction force plate 34 does not impede the inflation and deployment of the airbag 32. Namely, the airbag 32 is able to be inflated and deployed through the notched portion 34C to a rear side of the reaction force plate 34.

A lock mechanism 40 is configured including a left-right pair of lock bars each having a one-end portion 42A that is slidably retained in a guide groove 56 formed in the lower section 52 of the instrument panel 50, and having an other-end portion 42B that is swingably attached to an upper face of the reaction force plate 34. A recess 58 is integrally formed at a specific site on each of the left and right guide grooves 56 such that the one-end portion 42A of each of the lock bars 42 is housed immovably therein (sinks therein) after the reaction force plate 34 has been pulled out. Note that the one-end portion 42A of each of the lock bars 42 is, similarly to in the first exemplary embodiment, configured so as not to come out from the respective guide groove 56.

The third exemplary embodiment configured as described above enables the knees K of the passenger P to be effectively restrained even in cases in which a length along the height direction (thickness) has been reduced at a rear end portion of the instrument panel 50 and there is a wide space present at the front side of the knees K of the passenger P seated in the vehicle seat 12. Moreover, the reaction force plate 34 is supported so as to be able to swing by the lower section 52 of the instrument panel 50, and is linked to the airbag 32 by the strap 36, thereby enabling pull out of the reaction force plate 34 in conjunction with inflation and deployment of the airbag 32 to be realized with a simple configuration.

Moreover, as described above, the lock mechanism 40 includes the left-right pair of lock bars 42 having the one-end portions 42A slidably retained in the guide grooves 56 formed at the lower section 52 of the instrument panel 50, and having the other-end portions 42B swingably attached to the reaction force plate 34. The left and right guide grooves 56 each include the recess 58 immovably housing the one-end portion 42A of each of the lock bars 42 after the reaction force plate 34 has been pulled out. Blocking movement toward the front side of the pulled-out reaction force plate 34 (fixing of the reaction force plate 34) can accordingly be realized with a simple configuration.

Although the lower limb restraint airbag devices 30 according to the present exemplary embodiment has been described with reference to the drawings, the lower limb restraint airbag device 30 according to the present exemplary embodiment is not limited to those illustrated, and may be appropriately modified in design within a range not departing from the spirit of the present disclosure. For example, the inflators and the lower limb restraint airbag devices 30 may be provided to a door trim (omitted in the drawings) of a side door and to a console box (omitted in the drawings) rather than to the left-right pair of side walls 20.

Adopting such an approach enables the knees K and the shins S of the passenger P to be restrained at least at a typical position of the vehicle seat 12 (a position determined by regulations). Note that the side walls 20 may be provided so as to be integrated to the left and right sides of the vehicle seat 12 through non-illustrated coupling members or the like as long as this does not cause a problem regarding the ease of boarding or alighting the vehicle 10 by the passenger P. Adopting such an approach enables the knees K and the shins S of the passenger P to be restrained irrespective of the position of the vehicle seat 12 due to the side walls 20 moving as a single unit together with the vehicle seat 12.

Moreover, a configuration may be adopted in which a rectangular flat plate shaped lock plate (omitted in the drawings) is provided in the lock mechanism 40 of the first exemplary embodiment and the third exemplary embodiment instead of an upper-lower pair or a left-right pair of lock bars 42. In such cases, a configuration may be adopted in which a one-end portion and an other-end portion of the lock plate are formed so as to bulge in a circular column shape having a diameter greater than a plate thickness of the lock plate, and such that guide grooves 26, 56 and recesses 28, 58 also enable the one-end portion of the lock plate to slide in and be housed therein.

What is claimed is:

1. A lower limb restraint airbag device, comprising:
an airbag that is configured to be inflated and deployed toward a knee and a shin of a passenger seated in a vehicle seat by gas ejected from an inflator, and to make contact with at least the knee;
a reaction force plate that is configured to be pulled out to a seat front side of the airbag in conjunction with inflation and deployment of the airbag; and
a lock mechanism that is configured to block movement toward a seat front side of the pulled out reaction force plate,
wherein one each of the inflator, the airbag, the reaction force plate, and the lock mechanism is provided for a left knee and for a right knee of the passenger and is installed at respective side walls disposed at the left and right sides of the vehicle seat, and
wherein the reaction force plates are swingably supported by the side walls and are linked to the airbags by straps.

2. The lower limb restraint airbag device of claim 1, wherein:
the lock mechanism includes a lock bar having a one-end portion slidably retained in a guide groove formed at the side wall and having an other-end portion swingably attached to the reaction force plate; and
the guide groove includes a recess that immovably houses the one-end portion of the lock bar after the reaction force plate has been pulled out.

3. The lower limb restraint airbag device of claim 1, wherein:
the lock mechanism includes:
a striker that is provided at one of the reaction force plates, and
a hook that is provided at the other of the reaction force plates and that is configured to anchor to the striker; and
the reaction force plate provided with the hook is configured to swing with a delay relative to the reaction force plate provided with the striker.

4. The lower limb restraint airbag device of claim 3, wherein the reaction force plate provided with the hook is heavier than the reaction force plate provided with the striker.

5. The lower limb restraint airbag device of claim 3, wherein an ignition timing of the inflator that ejects gas into the airbag linked by the strap to the reaction force plate provided with the hook is delayed relative to an ignition timing of the inflator that ejects gas into the airbag linked by the strap to the reaction force plate provided with the striker.

6. The lower limb restraint airbag device of claim 1, wherein:
the lock mechanism includes:
a striker that is provided at one of the reaction force plates, and
a hook that is provided swingably at the other of the reaction force plates and that is configured to anchor to the striker; and
the hook is configured to swing and be anchored to the striker after the reaction force plate provided with the striker and the reaction force plate provided with the hook have been pulled out.

7. The lower limb restraint airbag device of claim 1, wherein the side walls are configured movably in the seat front-rear direction, with a rear end of the side walls disposed further toward a seat front side than a front end of a seat cushion of the vehicle seat while a vehicle is traveling, and with a front end of the side walls disposed either at a same position as, or further toward a seat rear side than, the front end of the seat cushion of the vehicle seat when a passenger is boarding or alighting.

8. The lower limb restraint airbag device of claim 7, wherein the side walls are configured to move toward the seat front side in conjunction with reclining of a seatback of the vehicle seat.

9. The lower limb restraint airbag device of claim 8, wherein the side walls are configured to move toward the seat front side in conjunction with reclining of a seatback of the vehicle seat by a specific angle or greater.

10. The lower limb restraint airbag device of claim 7, configured such that a seatback of the vehicle seat is not able to be reclined unless the rear end of the side walls is disposed further toward the seat front side than the front end of the seat cushion of the vehicle seat.

11. The lower limb restraint airbag device of claim 10, wherein a warning alarm is generated when a travel speed of the vehicle exceeds a specific speed and the left and right side walls continue to be disposed toward the seat rear side when the seatback is reclined or when a seatbelt is not being worn.

12. The lower limb restraint airbag device of claim 7, wherein only a side wall on a side door side of the respective side walls is configured movably.

13. A lower limb restraint airbag device, comprising:
an airbag that is configured to be inflated and deployed toward a knee and a shin of a passenger seated in a vehicle seat by gas ejected from an inflator, and to make contact with at least the knee;
a reaction force plate that is configured to be pulled out to a seat front side of the airbag in conjunction with inflation and deployment of the airbag; and
a lock mechanism that is configured to block movement toward a seat front side of the pulled out reaction force plate,
wherein one each of the inflator, the airbag, the reaction force plate, and the lock mechanism is provided for a left knee and for a right knee of the passenger and is installed at respective side walls disposed at the left and right sides of the vehicle seat, and
wherein the side walls are configured movably in the seat front-rear direction, with a rear end of the side walls disposed further toward a seat front side than a front end of a seat cushion of the vehicle seat while a vehicle is traveling, and with a front end of the side walls disposed either at a same position as, or further toward a seat rear side than, the front end of the seat cushion of the vehicle seat when a passenger is boarding or alighting.

14. The lower limb restraint airbag device of claim 13, wherein the side walls are configured to move toward the seat front side in conjunction with reclining of a seatback of the vehicle seat.

15. The lower limb restraint airbag device of claim 13, configured such that a seatback of the vehicle seat is not able to be reclined unless the rear end of the side walls is disposed further toward the seat front side than the front end of the seat cushion of the vehicle seat.

* * * * *